UNITED STATES PATENT OFFICE.

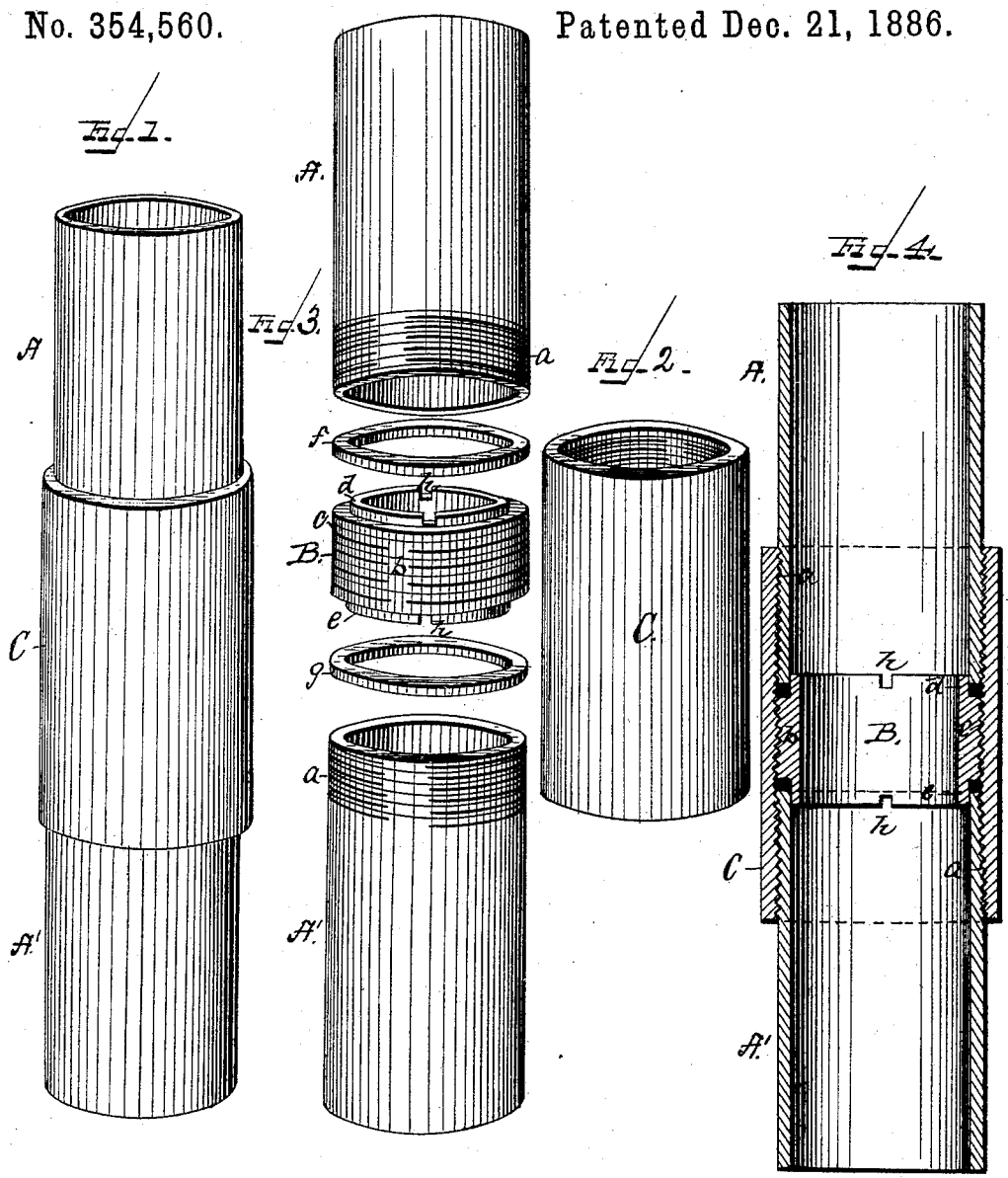

DAVID M. LEVIER, OF MILLERSTOWN, PENNSYLVANIA.

PIPE-COUPLING.

SPECIFICATION forming part of Letters Patent No. 354,560, dated December 21, 1886.

Application filed April 8, 1885. Serial No. 161,552. (No model.)

*To all whom it may concern:*

Be it known that I, DAVID M. LEVIER, a citizen of the United States of America, residing at Millerstown, in the county of Butler and State of Pennsylvania, have invented certain new and useful Improvements in Pipe-Couplings, of which the following is a specification.

My invention has relation to improvements in coupling means for connecting metal pipes; and the object is to provide means for the purpose stated which are simple in construction, easy of application, and effective and durable in results.

The purposes of my invention are attained by means of the devices illustrated in the accompanying drawings, forming a part of this specification, and wherein—

Figure 1 is a side view of two sections of metal pipe united by my improved coupling. Fig. 2 is a view of the outside metal sleeve. Fig. 3 is a detail view of the pipe-sections and the metal coupling-section and packing gaskets or rings, and Fig. 4 is a longitudinal central sectional view showing the parts united.

In the drawings like parts are identified by the same letters of reference.

The letters A and A' designate two sections of metal pipe provided on their approaching ends with screw-threads a, to receive the outside metal sleeve, hereinafter described.

The letter B designates the coupling-section. The body b of this coupling-section is exteriorly of the same diameter as the pipes to be connected, and is provided with screw-threads c, and the ends, which are of smaller diameter exteriorly than the body, are left plain and project, forming circular flanges d and e, to receive the small packing-gaskets f and g, and to pass a short distance into the ends of the pipes. In one or both ends of the coupling-section are formed slots or gains h, to serve as means to receive the blade of a flat wrench to screw the section within the outside sleeve.

The letter C designates the outside metal sleeve, made of the same diameter interiorly as the outer diameter of the pipes to be coupled, and provided with interior screw-threads to engage with the screw-threads on the coupling-section and with the threaded ends of the pipes.

The small packing-gaskets f g may be of any suitable material, such as lead, rubber, &c.

To connect the different parts, the coupling-section is started within the outside sleeve, and by means of a flat wrench set within the slots or gains it is screwed within the sleeve to about a central position therein. The packing-gaskets are then adjusted on the flanges of the coupling-section, and then the sleeve is screwed on the ends of the pipes, or the pipes are screwed into the sleeve successively. The ends of the flanges on the coupling-section enter the pipes for a short distance, to strengthen and perfect the continuous connection, and the ends of the pipes abut forcibly against the packing-gaskets, and a perfectly tight coupling is effected. The coupling is applicable to all connections of metal pipes, and when applied forms practically a continuous line of piping.

If preferred, the coupling-section can be formed integral with the outside sleeve.

I am aware that pipe-couplings have heretofore been made having a metal ring with tapering ends and unthreaded exterior interposed between the approaching ends of the pipe-sections, which are flared or beveled to admit the ends of the metal ring and its packing, and an exterior coupling-sleeve with screw-threaded ends to engage the ends of the pipe-sections, and that another pipe-coupling is made with a coupling-sleeve having interior screw-threads in its central portion to engage the ends of the pipe-sections, and enlarged projecting ends with interior screw-threads to engage metal rings having smooth interior surfaces and exterior screw-threads, said metal rings fitting over the pipe-sections and adapted to engage with the screw-threads of the enlarged projecting ends of the pipe-coupling. I make no claim to either of these special constructions, my invention being specifically pointed out in the claims hereto.

What I claim as my invention, and desire to secure by Letters Patent, is—

1. In combination with the pipe-sections A and A', provided with exterior screw-threads on their approaching ends, the removable coupling-section B, provided with exterior screw-threads and formed with projecting annular flanges d e, provided with gains or slots h, the packing-gaskets fitted over the annular end flanges of the coupling-section B, and the outside coupling-sleeve, C, having interior screw-threads extended over its length, to receive the threaded coupling-section B and to engage with the threaded ends of the pipe-sections, substantially as described.

2. The sleeve C, provided with interior screw-threads, the coupling-section B, having interior screw-threads fitted to the interior of the sleeve and formed with end flanges of smaller exterior diameter than the body of the coupling-section, the packing-gaskets adjusted to the end flanges of the coupling-section, and the pipe-sections having screw-threaded ends to engage with the screw-threads of the outside sleeve, all arranged and combined substantially as described, and for the purpose stated.

In witness whereof I have hereunto set my hand in the presence of two attesting witnesses.

DAVID M. LEVIER.

Attest:
A. M. CORNELIUS,
W. J. WELSH.